(12) United States Patent
Haddad

(10) Patent No.: US 10,711,901 B2
(45) Date of Patent: Jul. 14, 2020

(54) MAGNETIC SELF-CENTERING VALVE

(71) Applicant: Waleed Sami Haddad, San Francisco, CA (US)

(72) Inventor: Waleed Sami Haddad, San Francisco, CA (US)

( * ) Notice: Subject to any disclaimer, the term of this patent is extended or adjusted under 35 U.S.C. 154(b) by 90 days.

(21) Appl. No.: 15/728,963

(22) Filed: Oct. 10, 2017

(65) Prior Publication Data

US 2018/0100589 A1 Apr. 12, 2018

Related U.S. Application Data

(60) Provisional application No. 62/406,182, filed on Oct. 10, 2016.

(51) Int. Cl.
*F16K 31/08* (2006.01)
*F16K 3/18* (2006.01)
*F16K 3/02* (2006.01)

(52) U.S. Cl.
CPC .......... *F16K 3/0254* (2013.01); *F16K 3/0263* (2013.01); *F16K 3/18* (2013.01); *F16K 31/086* (2013.01)

(58) Field of Classification Search
CPC ........ F16K 3/0254; F16K 3/18; F16K 3/0263; F16K 31/086

USPC .......................................................... 251/65
See application file for complete search history.

(56) References Cited

U.S. PATENT DOCUMENTS

| | | | | |
|---|---|---|---|---|
| 2,589,188 A * | 3/1952 | De Craene | ............ | F16K 31/088 251/340 |
| 2,646,071 A * | 7/1953 | Wagner | ................ | F16K 15/023 137/528 |
| 2,949,931 A * | 8/1960 | Ruppright | ............... | F16K 15/02 137/515.7 |
| 3,495,620 A * | 2/1970 | Bazell | ..................... | F16K 31/08 137/529 |
| 3,995,661 A * | 12/1976 | Van Fossen | ............. | F16K 1/22 137/807 |
| 4,865,588 A * | 9/1989 | Flinchbaugh | ......... | A61F 5/4405 604/129 |
| 9,845,898 B1 * | 12/2017 | Johnson | ................... | F16K 17/02 |
| 2008/0271501 A1 * | 11/2008 | Roder | .................. | F16K 31/082 70/175 |

* cited by examiner

*Primary Examiner* — Umashankar Venkatesan
(74) *Attorney, Agent, or Firm* — Mueting Raasch Group

(57) ABSTRACT

A magnetic valve comprises an axially magnetized valve body comprising a bore and an axially magnetized gate moveable relative to the bore. The gate is dimensioned to cover the bore in a closed state and expose the bore in an open state. The valve body and the gate are configured to self-align along their central axes.

20 Claims, 7 Drawing Sheets

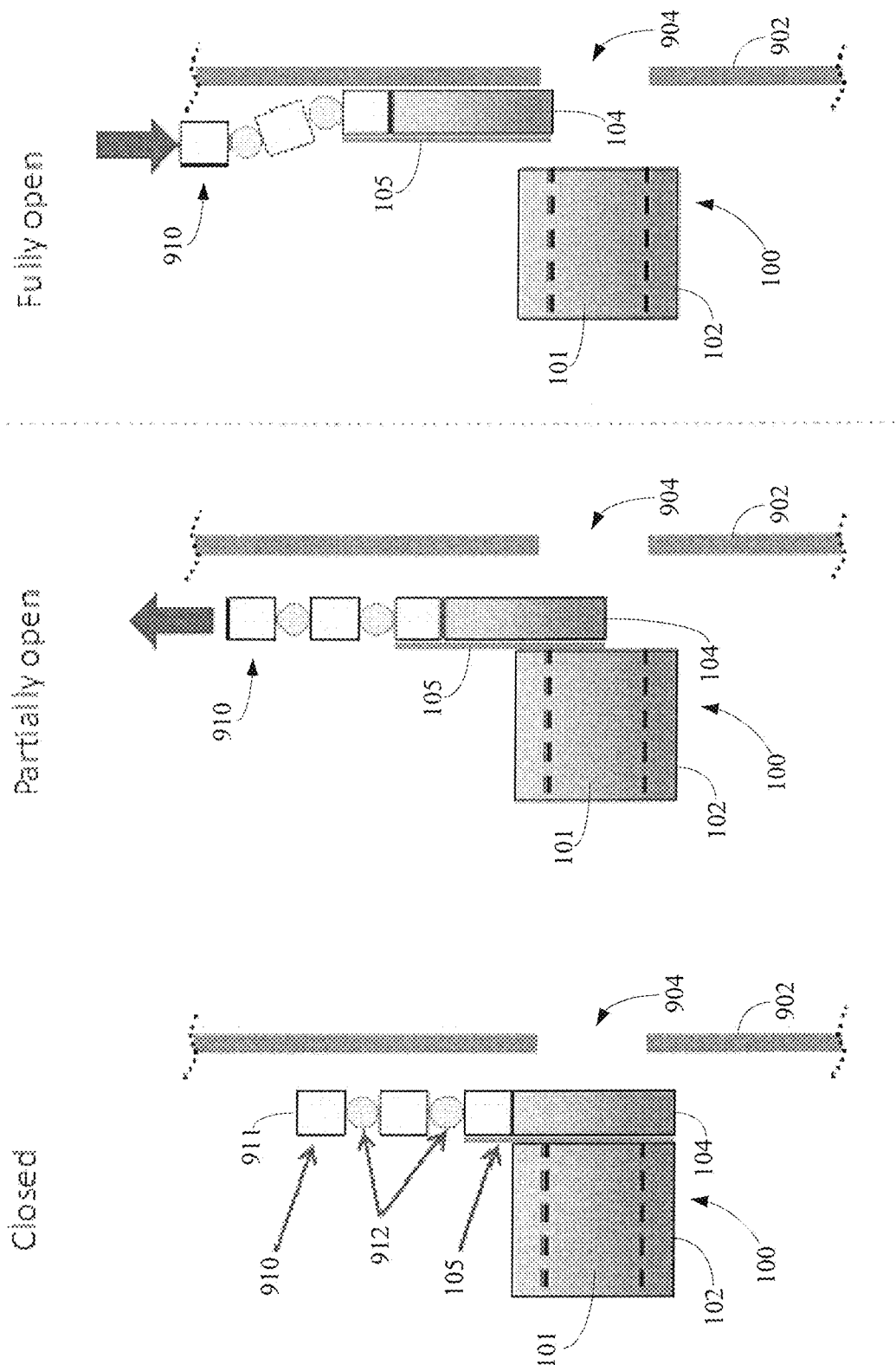

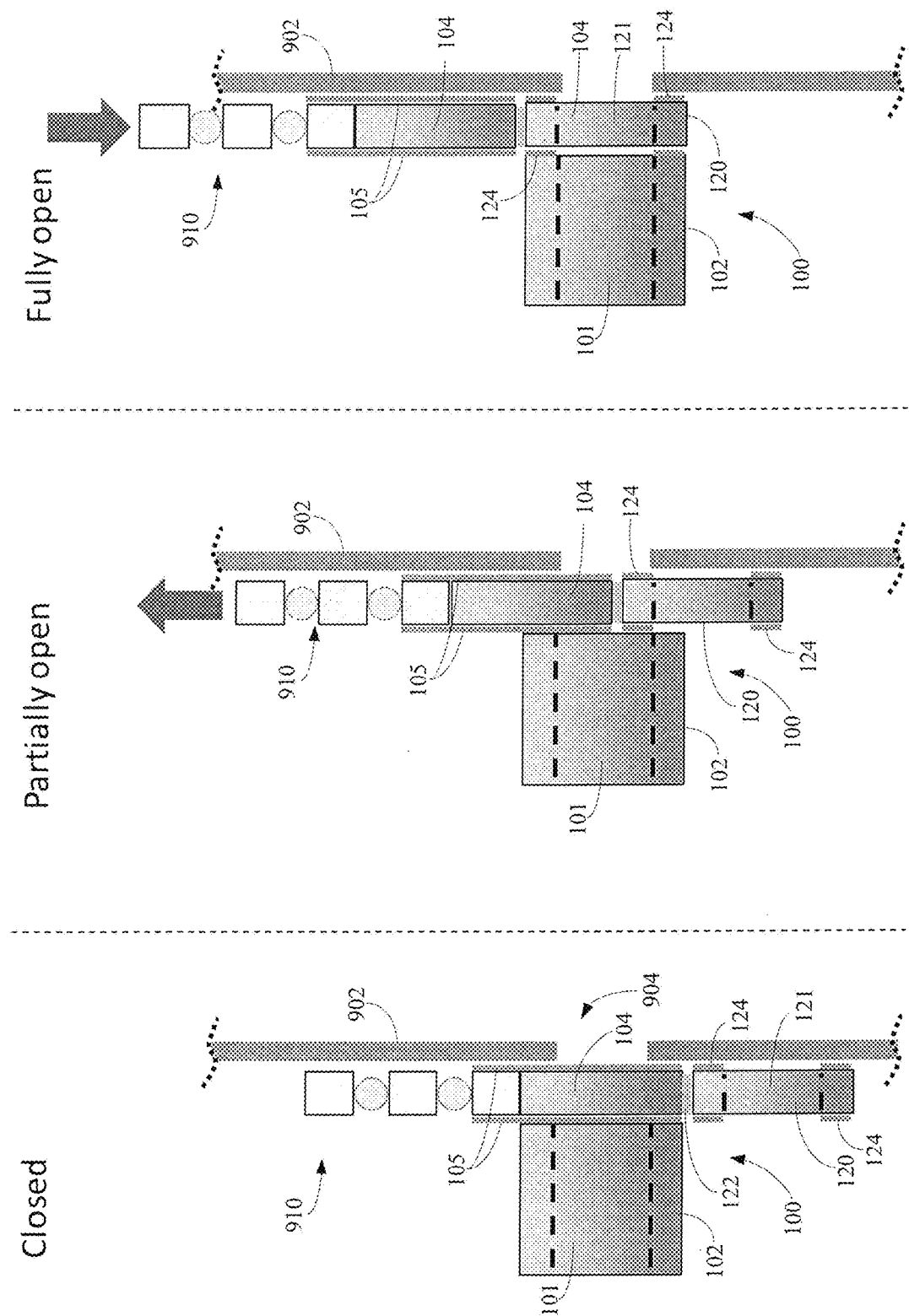

MAGNETIC SELF-CENTERING VALVE

RELATED PATENT DOCUMENTS

This application claims the benefit of Provisional Patent Application Ser. No. 62/406,182, filed on Oct. 10, 2016, to which priority is claimed pursuant to 35 U.S.C. § 119(e) and which is hereby incorporated herein by reference.

SUMMARY

Embodiments of the disclosure are directed to a magnetic valve comprising an axially magnetized valve body comprising a bore and an axially magnetized gate moveable relative to the bore. The gate is dimensioned to cover the bore in a closed state and expose the bore in an open state. The valve body and the gate are configured to self-align along their central axes.

Embodiments of the disclosure are directed to a magnetic valve comprising an axially magnetized valve body comprising a bore and an axially magnetized gate moveable relative to the bore. The gate is dimensioned to cover the bore in a closed state and expose the bore in an open state. The valve body and the gate are configured to self-align along their central axes. A natural magnetic repulsive force between the valve body and the gate facilitates movement of the gate away from the bore when the valve is moved from the closed state to the open state. A natural magnetic restoring force between the valve body and the gate facilitates movement of the gate toward the bore when the valve is moved from the open state to the closed state.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 9 shows a self-aligning magnetic valve actuatable by mechanical linkage in a closed state in accordance with various embodiments;

FIG. 10 shows a self-aligning magnetic valve actuated by mechanical linkage in a partially open state in accordance with various embodiments;

FIG. 11 shows a self-aligning magnetic valve actuated by mechanical linkage in a fully open state in accordance with various embodiments;

FIG. 12 shows a self-aligning magnetic valve actuatable by mechanical linkage in a closed state in accordance with various embodiments;

FIG. 13 shows a self-aligning magnetic valve actuated by mechanical linkage in a partially open state in accordance with various embodiments;

FIG. 14 shows a self-aligning magnetic valve actuated by mechanical linkage in a fully open state in accordance with various embodiments;

The figures are not necessarily to scale. Like numbers used in the figures refer to like components. However, it will be understood that the use of a number to refer to a component in a given figure is not intended to limit the component in another figure labeled with the same number.

DESCRIPTION

Figure 1:
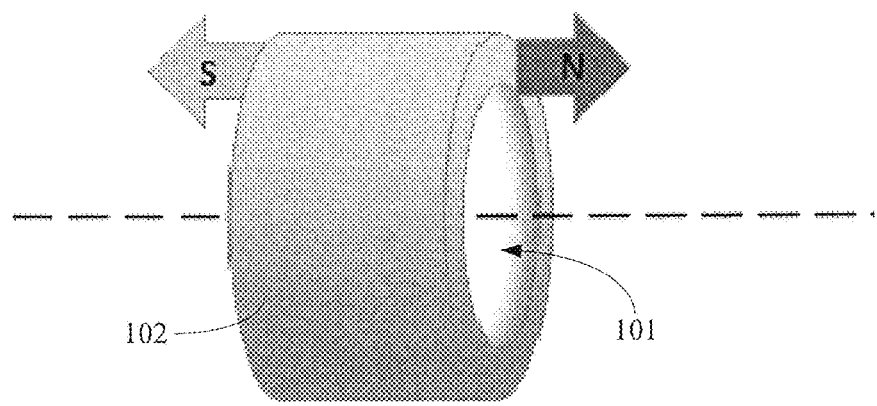
FIG. 1 shows a magnetic valve body of a self-aligning magnetic valve in accordance with various embodiments.

Embodiments of the disclosure are directed to a self-aligning magnetic valve that can be configured for use in many applications. These valves can be made as large or as small as the available sizes of available magnets, or magnetizable materials. Very large versions can also be constructed by using an array of smaller magnets embedded in the mating faces of the valve body and valve gate part.

A self-aligning magnetic valve of the present disclosure is of particular use in cases where a very tiny valve is needed, and small opening and closing forces are required. For example, a self-aligning magnetic valve can be made very small (e.g., as small as the magnets or magnetic material that can be obtained), which is an excellent solution for very tiny valves. For small valves, readily available magnet part diameters between $\frac{1}{16}$" and $\frac{1}{4}$" are useful, however much smaller sizes are possible, and may be very useful for some applications. In some cases, very small ($<\frac{1}{16}$" diameter) magnetic rings, tubes and discs can be obtained, and in other cases, small ferromagnetic metal parts can be machined, and made magnetically polarized using either fixed magnets, electromagnets or wire coils to magnetize the parts.

For large sizes, solid magnet discs and rings up to 3" in diameter are readily available, however this does not limit the size of such a valve because much larger sizes can be constructed by making the body (ring) and gate (disc) parts of the valve from a non-magnetic material, such as ABS, PTFE or the like, and embedding smaller magnets into the mating faces of both the ring and disc parts of the valve. Magnetic valves of the present disclosure can be used for a wide variety of gasses and liquids, as an audio or light port, or for anything the does not corrode the magnetic material of the valves. Additionally, the magnetic valve parts can be coated with PTFE, other polymers, special paints, certain metals or other non-ferromagnetic materials to provide specific chemical resistance, or otherwise stop corrosion if necessary, or aid in actuation of the valve by reducing friction between the valve parts.

A self-aligning magnetic valve of the present disclosure includes a magnetic valve body and a magnetic gate. In some embodiments, the entirety of the magnetic valve body and the magnetic gate are made from magnetic material. In other embodiments, the magnetic valve body and the magnetic gate are constructed from a non-magnetic material, and discrete magnets are embedded in opposing faces of the magnetic valve body and the magnetic gate. In still other embodiments, either the magnetic valve body or the magnetic gate (or both) are constructed from a ferromagnetic material, and are magnetically polarized by electrical current, as in an electromagnet. In these embodiments, the magnetic valve body and the magnetic gate define or comprise axially polarized magnetic structures that self-align along their central axes to provide a "snap-to-center" capability.

An actuation mechanism can be provided to initiate movement of the magnetic gate relative to the magnetic valve body. Advantageously, the magnetic gate is self-aligning with the magnetic valve body. The natural magnetic restoring force between the magnetic gate and valve body can be used as a closing spring. The natural magnetic repulsive force that occurs on opening the valve pushes the magnetic gate away from the magnetic valve body which helps keep the valve open. As such, the natural magnetic restoring and repulsive forces developed between the magnetic valve body and the magnetic gate serves as a component of the valve's actuation mechanism.

Figure 2:
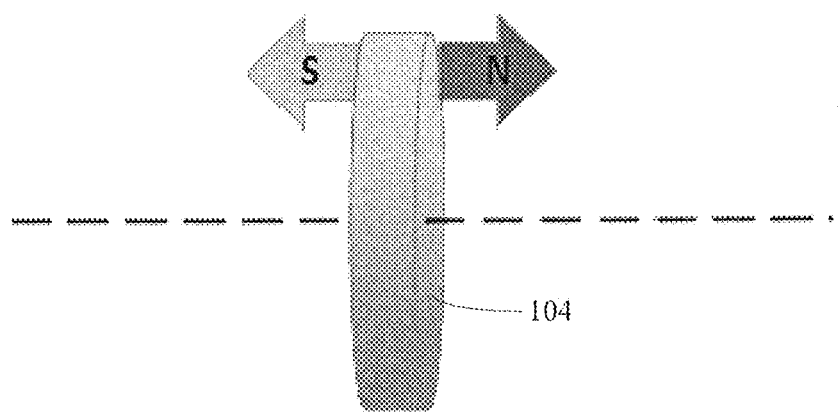
FIG. 2 shows a magnetic gate of a self-aligning magnetic valve in accordance with various embodiments.

In various embodiments, and with reference to FIG. 1, the magnetic valve body 102 of a self-aligning magnetic valve comprises an axially polarized ring or cylinder magnet. The magnetic valve body 102 includes a bore 101. The self-aligning magnetic valve also includes a magnetic gate 104, an embodiment of which is shown in FIG. 2. The magnetic gate 104 can comprise an axially polarized disc magnet (e.g., a solid disc).

Although shown generally herein as cylindrical structures, the magnetic valve body 102 and magnetic gate 104 can be any shape as long as they are axially polarized. For example, the magnetic valve body 102 and magnetic gate 104 can have a square, rectangular, circular or oval cross-sectional shape. The holding and opening forces of the magnetic valve can be controlled by the type of magnet used (different types have different strengths), the size of the magnets, and the presence of a spacer between the magnetic valve body 102 and magnetic gate 104 (larger spacers reduce the magnetic force). This spacer, or special coatings, can help reduce friction between the valve parts, thereby reducing the actuation force required, and also may provide protection against wear and corrosion.

As will be described below, the magnetic gate 104 (e.g., disc magnet) is self-aligning with the magnetic valve body 102 (e.g., cylinder magnet). FIGS. 3-13 show this relationship in greater detail.

Figure 3:
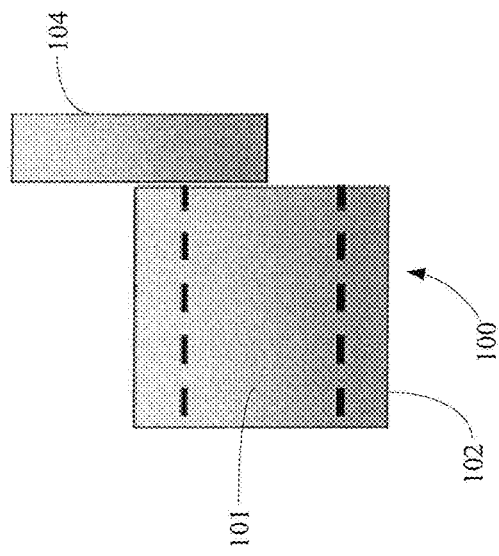
FIG. 3 shows a self-aligning magnetic valve in a closed state in accordance with various embodiments.

FIG. 3 shows the self-aligning magnetic valve 100 in a closed state or position. In FIG. 3, the magnetic valve body 102 is shown as a cylinder magnet with a bore 101. The magnetic gate 104 is shown as a disc magnet. With both magnets 102 and 104 axially polarized, the magnetic gate 104 and the magnetic valve body 102 self align along their central axes, and magnetically stick together when the poles are oriented N to S as shown. The magnetic sticking force is dependent on magnet type size and geometry. With the magnetic valve 100 in the state shown in FIG. 3, the valve 100 is closed, whereby liquids or gases (or sound or light) are prevented from existing or entering the bore 101 of the magnetic valve body 102 by the magnetic gate 104.

Figure 4:
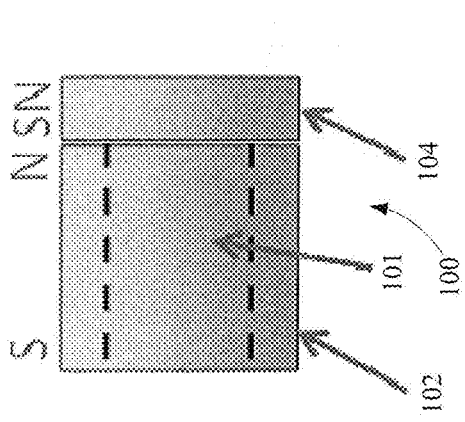
FIG. 4 shows a self-aligning magnetic valve between a closed state and a partially open state in accordance with various embodiments.

FIG. 4 shows the magnetic valve 100 in a closed state but with the magnetic gate 104 partially displaced by a sideways force applied to the magnetic gate 104. The force applied to the magnetic gate 104 can be any force applied in a direction transverse to the central axis of the magnetic valve 100. In this illustrative example, the force (indicated by the arrow) is applied to the magnetic gate 104 from a direction normal to the valve's central axis. It is understood that the force can be applied to the magnetic valve body 102 rather than to the magnetic gate 104 or opposing forces can be applied to both components 102, 104 of the magnetic valve 100. For example, to open the magnetic valve 100 with the smallest actuation force, one of the two valve components 102, 104 (usually the smaller magnetic disk 104) is pushed sideways parallel to the face of the magnets 102, 104. The force required to do this is much less than the force needed to pull the two valve components 102, 104 apart in the axial direction.

Figure 5:
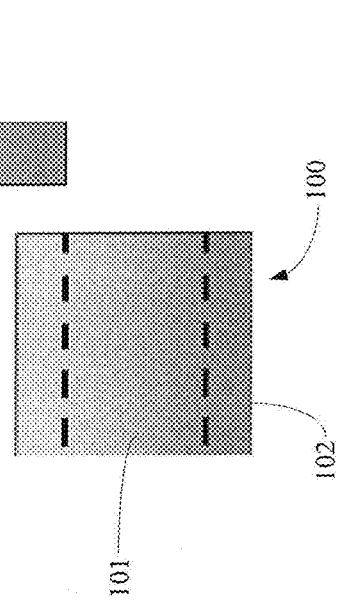
FIG. 5 shows a self-aligning magnetic valve in a partially open state in accordance with various embodiments.

FIG. 5 shows the magnetic valve 100 in a partially open state. In this state, the magnetic gate 104 is moved sideways (in a direction transverse to the central axes of the magnetic valve body 102 and the magnetic gate 104), exposing at least some of the bore 101 of the cylinder magnet. As the magnetic gate 104 moves to the side, for some distance, there is a natural restoring force which pulls it back towards alignment with the magnetic valve body 102. In addition, there is a stronger holding force that keeps the magnetic gate 104 held against the face of the magnetic valve body 102.

Figure 6:
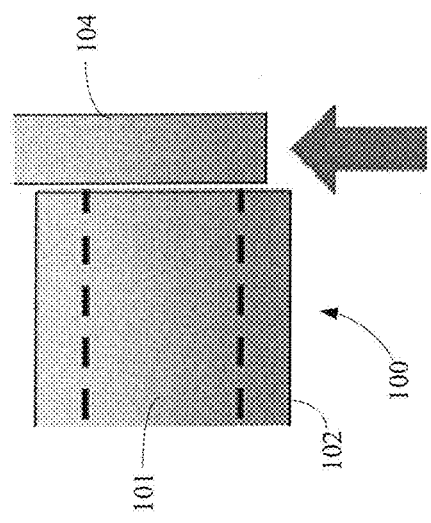
FIG. 6 shows a self-aligning magnetic valve in a fully open state in accordance with various embodiments.

FIG. 6 shows the magnetic valve 100 in a fully open state. In this state, the bore 101 of the magnetic valve body 102 is fully exposed, allowing fluids or gasses (or sound or light) to pass unimpeded by the magnetic gate 104. Once the magnetic gate 104 has moved sideways past a certain point, typically when its outer edge aligns with the inner edge of the magnetic valve body's bore 101, the holding force reverses suddenly, and the magnetic gate 104 is repelled away from the magnetic valve body 102 in the axial direction as shown in FIG. 6 (see gap between the two valve components 102 and 104). However, there remains a small restoring force that seeks to align the two valve components 102 and 104 again. This natural restoring force can be used to facilitate closing of the magnetic valve 100.

Figure 7:
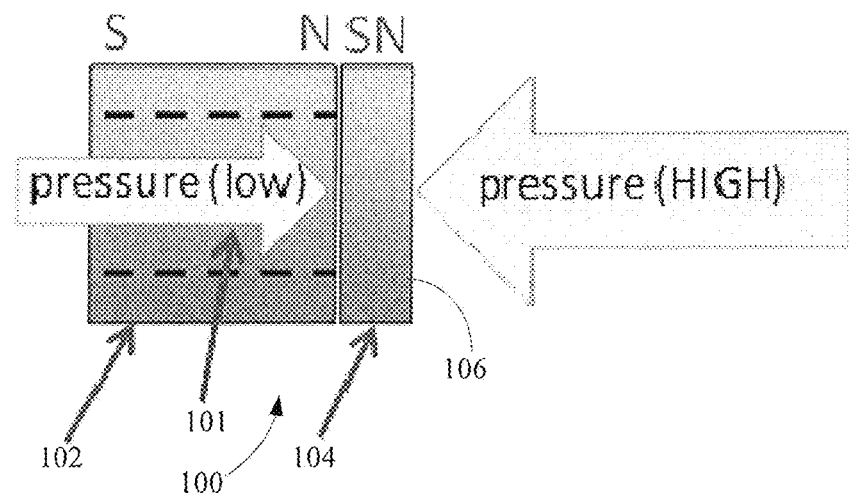
FIG. 7 shows a self-aligning magnetic valve in a closed state in accordance with various embodiments.
Figure 8:
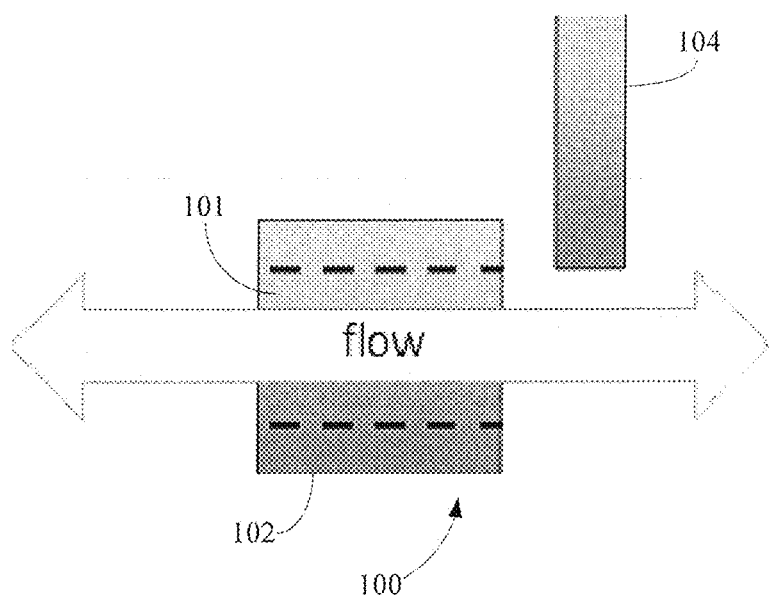
FIG. 8 shows a self-aligning magnetic valve in a fully open state in accordance with various embodiments.

FIGS. 7 and 8 illustrate a scenario in which the magnetic valve 100 is used in a pressurized line, such as a water or natural gas line. FIG. 7 shows the magnetic valve 100 in a closed state. FIG. 8 shows the magnetic valve 100 in a fully open state.

The magnetic valve 100, in the closed state, can handle a relatively low pressure within the bore 101 of the magnetic valve body 102 and a relatively high pressure at the side 106 of the magnetic gate 104 which covers the bore 101. The magnetic valve 100 can hold off pressure from either side, however, it can hold off much higher pressure from the "outside," which is the side 106 that naturally forces the valve 100 closed by pushing the magnetic gate 104 against the magnetic valve body 102 (e.g., the high pressure side shown in FIG. 7). With the valve 100 open, as shown in FIG. 8, the material can flow freely through the bore 101 of the magnetic valve body 102. A magnetic valve 100 of the present disclosure can be used for controlling the flow of gasses, liquids, sound, light or any non-ferromagnetic or magnetic materials as long as the materials do not corrode or abrade the magnets too much during the expected life of the valve 100.

Typically, the magnetic valve body 102 will be fixed into a flange, panel, or other structure, and the magnetic gate 104 will be attached via some linkage to an actuator (e.g., motor, lever, spring mechanism) that pushes it sideways to open and close the valve 100. It is possible, under the right conditions, that the actuator need only apply force to open the valve 100 and release for closing because the magnetic restoring force will close the valve 100 on its own as long as there is nothing impeding its movement, and the magnetic gate 104 is not displaced sideways by more than a distance approximately equal to the diameter of the magnets 102, 104.

FIGS. 9-11 illustrate a representative actuation mechanism for the magnetic valve 100. A wall structure 902 with an orifice 904 is shown positioned to the right of the magnetic valve 100 in FIGS. 9-11. A mechanical linkage 910 is shown connected to the magnetic gate 104. A spacer 105, such as a protective membrane, can be situated between the magnetic valve body 102 and the magnetic gate 104. The spacer 105 can extend beyond the magnetic valve 100 and contact a portion of the linkage 910. The spacer 105 can be used to moderate (e.g., adjust or reduce) the magnetic force between the magnetic valve body 102 and the magnetic gate 104. A larger spacer 105 positioned between the magnetic valve body 102 and the magnetic gate 104 will reduce the magnetic force to a greater extent than a smaller spacer. In some embodiments, the spacer 105 can serve as a protective membrane. For example, the spacer 105 can be both a protective material and a resilient material that works as a seal.

Typically, the magnetic valve body 102 is installed into a panel, flange, conduit, or other part of the structure 902 in which the magnetic valve 100 is needed, and the magnetic gate 104 is attached to a linkage 910 that moves it sideways, perpendicular to the polarization axis of the magnets 102, 104, to open and close the valve 100. In FIGS. 9-11, the linkage 910 includes link members 911 connected to each other via hinges 912, which allows flexing of the linkage 910 during use (see FIG. 11). It is understood that the linkage 910 does not need to have the flexibility shown herein, if not desired. It is also understood that the magnetic gate 104 may be purposely constrained to move only laterally, if needed, but may be configured to move in different directions (e.g., at an oblique angle away from the magnetic valve body 102).

FIG. 9 shows the magnetic valve 100 in a closed state. FIG. 10 shows a pull force being applied to the magnetic gate 104 via the linkage 910. The pull force causes the magnetic gate 104 to move sideways to a partially open state until a fully open state is reached, as shown in FIG. 11. The pull force is maintained on the linkage 910 to keep the magnetic valve 100 open. When it is desired to close the magnetic valve 100, there are two ways to initiate valve closure. One approach involves application of a push force to the linkage 910, which causes the magnetic gate 104 to move sideways toward the magnetic valve body 102. At some point, the natural magnetic restoring force will urge the magnetic gate 104 to self-align with the magnetic valve body 102, which can reduce or eliminate the need for the push force during the later portion the valve closure process. The other approach involves simply releasing the pull/holding force on the linkage 910, allowing the natural magnetic restoring force to urge the magnetic gate 104 into self-alignment with the magnetic valve body 102, thereby closing the magnetic valve 100.

FIGS. 12-14 illustrate a representative actuation mechanism for a magnetic valve 100 comprising an additional ring magnet 120 in accordance with various embodiments. The addition of the ring magnet 120 provides for a bi-stable continuous sealing magnetic valve 100. The magnetic valve 100 shown in FIGS. 12-14 is similar to that shown in FIGS. 9-11, but includes additional features. The magnetic valve 100 further includes an axially magnetized ring magnet 120 attached to an external surface of the magnetic gate 104 via a connector 122.

The connector 122 can be a small spacer made of plastic or metal (e.g., aluminum). The connector 122 can be a mechanical connection between the ring magnet 120 and the magnetic gate 104, such as a type of yoke or frame that holds the ring magnet 120 and the magnetic gate 104 in place adjacent to each other. In this case, connector 122 is a septum that is part of the frame. A direct connection 122 can also be made between the ring magnet 120 and the magnetic gate 104, or to the connector 122 via a screw or rivet tying them together. The ring magnet 120 and the magnetic gate 104 can also be fastened to each other directly or to the connector 122 via an adhesive.

The ring magnet 120 includes a bore 121 preferably of the same size as the bore 101 of the magnetic valve body 102. The ring magnet 120 includes a bottom surface and an opposing top surface connected to a lower surface of the magnetic gate 104 via the connector 122. An upper surface of the magnetic gate 104 is connected to the linkage 910.

Spacers 105 are disposed on opposing faces of the magnetic gate 104, and can extend beyond the upper surface of the magnetic gate 104 to cover a portion of the linkage 910. Spacers 124 are disposed on opposing faces of the magnetic ring 120. In some embodiments, the spacers 105 and 124 comprise seals that provide a continuous seal between the magnetic valve 100 and the structure 902 during actuation of the magnetic gate 104. The spacers 105 and 124 can be formed from either a rigid or a resilient material. Suitable materials for the spacers 105 and 124 include PTFE, which provides both corrosion resistance and friction reduction, Kapton, some type of rubber such as silicone, Buna N or Viton (typical O-ring material), any polymer that may be useful including powder coating materials, various plastics, or even non-ferromagnetic metals such as aluminum or copper. The choice of spacer or coating material will depend on the application of, and requirements, for the magnetic valve.

FIG. 12 shows the magnetic valve 100 in a closed state. In the closed state, the bore 101 of the magnetic valve body 102 remains sealed by the magnetic gate 104 and spacer 105. FIG. 13 shows a pull force being applied to the magnetic gate 104 via the linkage 910. The pull force causes the magnetic gate 104 and the ring magnet 124 to move sideways to a partially open state until a fully open state is reached, as shown in FIG. 14. In the partially open state shown in FIG. 13, the bore 101 of the magnetic valve body 102 remains sealed by spacers 105 of the magnetic gate 104 and spacers 124 of the ring magnet 120. The pull force is maintained on the linkage 910 to keep the magnetic valve 100 open, as is shown in FIG. 14. When fully open, the bore 101 of the magnetic valve body 102 in aligned with the bore 121 of the ring magnet 120. The magnetic valve body 102 remains sealed by spacers 124 of the ring magnet 120 in contact with the face of the magnetic valve body 102 and the structure 902. When it is desired to close the magnetic valve 100, a push force is applied to the linkage 910, which causes the magnetic gate 104 and ring magnet 120 to move sideways toward the magnetic valve body 102. At some point, the natural magnetic restoring force will urge the magnetic gate 104 to self-align with the magnetic valve body 102.

Figure 15:
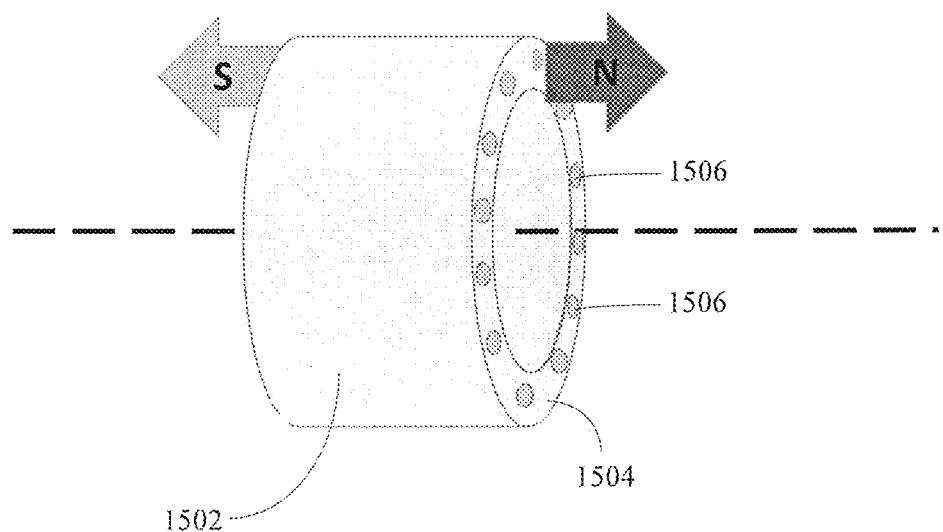
FIG. 15 shows a magnetic valve body of a self-aligning magnetic valve in accordance with various embodiments.
Figure 16:
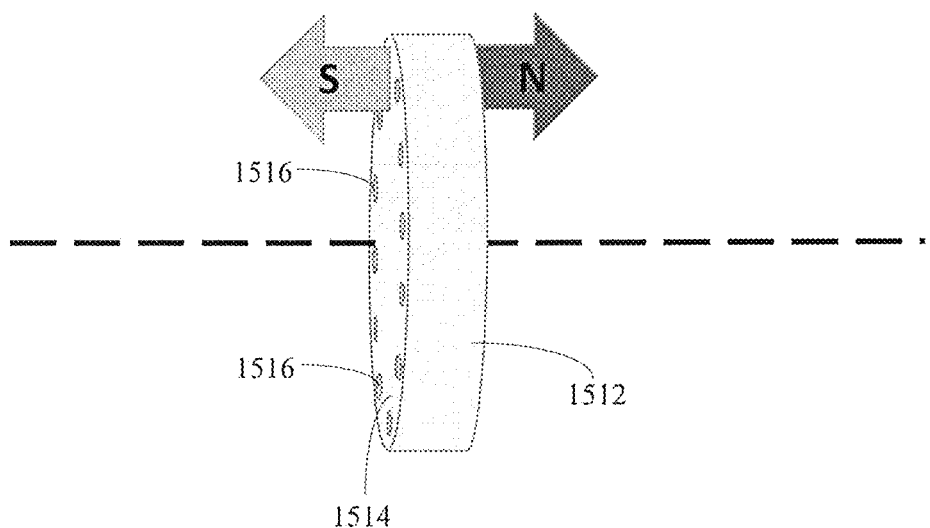
FIG. 16 shows a magnetic gate of a self-aligning magnetic valve in accordance with various embodiments.

FIGS. 15 and 16 illustrate components of a self-aligning magnetic valve in accordance with some embodiments. FIG. 15 shows a magnetic valve body 1502 formed from a non-magnetic material, such as ABS, PTFE or the like. The magnetic valve body 1502 includes a face 1504 into which small discrete magnets 1506 are embedded. As shown, a number of discrete magnets 1506 are distributed about the periphery of the face 1504 of the magnetic valve body 1502. The discrete magnets 1506 are axially polarized as shown in FIG. 15. The outside surface of the magnets 1506 are preferably flush with the non-magnetic material of the face 1504, and can be covered by a protective material (e.g., a resin or epoxy).

FIG. 16 shows a magnetic gate 1512 formed from a non-magnetic material, such as ABS, PTFE or the like. The magnetic gate 1512 includes a face 1514 into which small discrete magnetic 1516 are embedded. As shown, a number of discrete magnets 1516 are distributed about the periphery of the face 1514 of the magnetic gate 1512. The discrete magnets 1516 are axially polarized as shown in FIG. 16. The outside surface of the magnets 1516 are preferably flush with the non-magnetic material of the face 1514, and can be covered by a protective material (e.g., a resin or epoxy).

With the faces 1504 and 1514 embedded with axially polarized discrete magnets 1506 and 1516 as shown in FIGS. 15 and 16, the magnetic gate 1512 and the magnetic valve body 1502 self-align along their central axes, and magnetically stick together when the poles are oriented N to S. A magnetic valve comprising the magnetic gate 1512 and the magnetic valve body 1502 shown in FIGS. 15 and 16 can be configured to cooperate in a manner previously described with reference to FIGS. 1-14. A magnetic valve comprising the magnetic gate 1512 and the magnetic valve body 1502 shown in FIGS. 15 and 16 is particularly suited for large magnetic valves (e.g., >3" diameter).

It is noted that, in some embodiments, one of the magnetic valve body 1502 and the magnetic gate 1512 can be formed from magnetic material, and the other of the magnetic valve body 1502 and the magnetic gate 1512 can be formed from non-magnetic material but include a face comprising discrete magnets. For example, the magnetic gate 1512 can be formed entirely from magnetic material (e.g., like the magnetic gate 104 shown in FIG. 2), and the magnetic valve body 1502 can be formed from a non-magnetic material and include discrete magnets 1506 distributed about the face 1504 of the magnetic valve body 1502.

Figure 17:
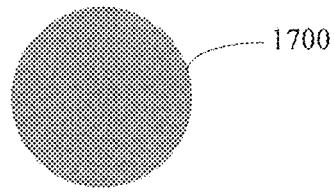
FIG. 17 shows a magnetic valve having a circular cross-section.
Figure 18:
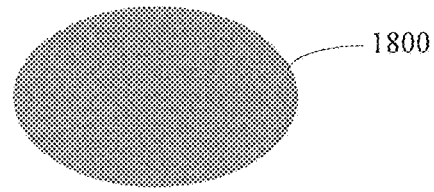
FIG. 18 shows a magnetic valve having an elliptical or oval cross-section.
Figure 19:
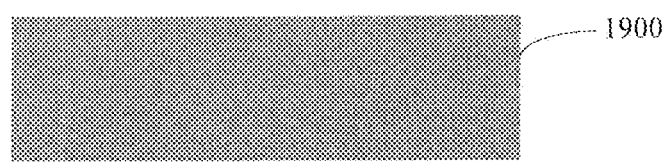
FIG. 19 shows a magnetic valve having a rectangular cross-section.
Figure 20:
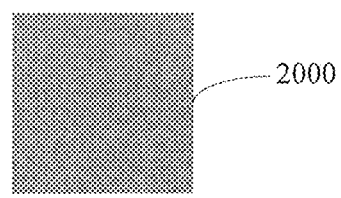
FIG. 20 shows a magnetic valve having a square cross-section.

As was discussed previously, a self-aligning magnetic valve of the present disclosure can have various shapes. FIG. 17 shows a magnetic valve 1700 having a circular cross-section. FIG. 18 shows a magnetic valve 1800 having an elliptical or oval cross-section. FIG. 19 shows a magnetic valve 1900 having a rectangular cross-section. FIG. 20 shows a magnetic valve 2000 having a square cross-section.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A magnetic valve, comprising:
   an axially polarized valve body comprising a bore;
   an axially polarized gate moveable relative to the bore, the gate dimensioned to cover the bore when the magnetic valve is in a closed state and expose the bore when the magnetic valve is in an open state; and
   a linkage coupled to the gate and configured to cause initial movement of the gate relative to the valve body in response to a force applied to the linkage at least when the magnetic value is actuated from the closed state to the open state;
   wherein the valve body and the gate are configured to magnetically self align along their central axes and the gate is movable relative to the bore in response to one or both of a natural magnetic repulsive force that pushes the gate away from the valve body after the initial movement of the gate when the magnetic valve is actuated from the closed state to the open state and a natural magnetic restoring force that pulls that gate toward the valve body so as to cover the bore when the magnetic valve is actuated from the open state to the closed state.

2. The magnetic valve of claim 1, wherein the valve body and the gate are formed from a magnetic material.

3. The magnetic valve of claim 1, wherein:
   at least a portion of the valve body and at least a portion of the gate are formed from a non-magnetic material; and
   opposing faces of the valve body and the gate comprise magnetic material.

4. The magnetic valve of claim 1, wherein the linkage is configured to move the gate toward the valve body in response to a force applied to the linkage when the magnetic valve is actuated from the open state to the closed state.

5. The magnetic valve of claim 1, wherein:
   the linkage is configured to release the gate when the magnetic valve is in the open state and in response to initiating closure of the magnetic valve; and
   the natural magnetic restoring force between the valve body and the gate causes the gate to move toward the bore and to cover the bore after the gate is released by the linkage.

6. The magnetic valve of claim 1, wherein the mechanical linkage is configured to facilitate movement of the gate relative to the bore between closed and open states of the magnetic valve.

7. The magnetic valve of claim 1, further comprising a spacer disposed between the valve body and the gate.

8. The magnetic valve of claim 7, wherein the spacer serves as a seal between the valve body and the gate.

9. The magnetic valve of claim 7, wherein the spacer is configured to moderate a magnetic force between the valve body and the gate.

10. The magnetic valve of claim 1, wherein the valve has a cylindrical shape.

11. The magnetic valve of claim 1, wherein the valve body and the gate have one of a square, rectangular, circular, and oval cross-sectional shape.

12. The magnetic valve of claim 1, wherein the valve is configured to receive a pressurized liquid or a pressurized gas.

13. The magnetic valve of claim 1, wherein the valve is configured to receive sound or light.

14. The magnetic valve of claim 1, comprising an axially polarized ring magnet connected to the gate, the ring magnet comprising a bore.

15. A magnetic valve, comprising:
   an axially polarized valve body comprising a bore; and an axially polarized gate moveable relative to the bore, the gate dimensioned to cover the bore when the magnetic valve is in a closed state and expose the bore when the magnetic valve is in an open state; and a linkage coupled to the gate and configured to cause initial movement of the gate relative to the valve body in response to a force applied to the linkage; wherein:

the valve body and the gate are configured to magnetically self align along their central axes;

the magnetic valve is configured to actuate from the closed state to the open state in response to the initial movement of the gate via the linkage and further by a natural magnetic repulsive force developed between the valve body and the gate which causes the gate to move away from the bore so as to expose the bore; and the magnetic valve is configured to actuate from the open state to the closed state at least in response to a natural magnetic restoring force developed between the valve body and the gate which causes the gate to move toward the bore and to cover the bore.

16. The magnetic valve of claim 15, wherein the valve body and the gate are formed from a magnetic material.

17. The magnetic valve of claim 15, wherein:

at least a portion of the valve body and at least a portion of the gate are formed from a non-magnetic material; and opposing faces of the valve body and the gate comprise magnetic material.

18. The magnetic valve of claim 15, further comprising a spacer disposed between the valve body and the gate, wherein the spacer is configured to moderate a magnetic force between the valve body and the gate.

19. The magnetic valve of claim 15, wherein the valve is configured to receive a pressurized liquid, a pressurized gas, light or sound.

20. The magnetic valve of claim 15, comprising an axially polarized ring magnet connected to the gate, the ring magnet comprising a bore.

* * * * *